United States Patent
Wang et al.

(10) Patent No.: US 11,965,086 B2
(45) Date of Patent: Apr. 23, 2024

(54) STYRENE-ISOPRENE-STYRENE TRIBLOCK COPOLYMER AND METHOD FOR MANUFACTURING THE SAME, COMPOSITION AND ADHESIVE COMPOSITION THEREOF

(71) Applicant: LCY CHEMICAL CORP., Kaohsiung (TW)

(72) Inventors: Chun-Hung Wang, Kaohsiung (TW); Ging-Ming Wang, Kaohsiung (TW)

(73) Assignee: LCY CHEMICAL CORP., Kaohsiung (TW)

( * ) Notice: Subject to any disclaimer, the term of this patent is extended or adjusted under 35 U.S.C. 154(b) by 351 days.

(21) Appl. No.: 17/079,032

(22) Filed: Oct. 23, 2020

(65) Prior Publication Data
US 2021/0317298 A1     Oct. 14, 2021

(30) Foreign Application Priority Data
Apr. 1, 2020   (CN) .......................... 202010248735.1

(51) Int. Cl.
| | | |
|---|---|---|
| C08L 53/02 | (2006.01) | |
| C08F 2/26 | (2006.01) | |
| C08F 112/08 | (2006.01) | |
| C08F 136/08 | (2006.01) | |

(Continued)

(52) U.S. Cl.
CPC ................ *C08L 53/02* (2013.01); *C08F 2/26* (2013.01); *C08F 112/08* (2013.01); *C08F 136/08* (2013.01); *C08K 5/005* (2013.01); *C09J 7/35* (2018.01); *C09J 2453/00* (2013.01); *C09J 2491/00* (2013.01)

(58) Field of Classification Search
CPC .. C08F 297/046; C08F 212/08; C08F 236/08; C08F 112/08; C08F 136/08
See application file for complete search history.

(56) References Cited

U.S. PATENT DOCUMENTS

| | | | | |
|---|---|---|---|---|
| 5,266,394 A | * | 11/1993 | Diehl ........................ | B32B 7/12 |
| | | | | 442/398 |
| 6,180,229 B1 | * | 1/2001 | Becker ...................... | C09J 7/243 |
| | | | | 604/389 |

(Continued)

FOREIGN PATENT DOCUMENTS

| | | | | |
|---|---|---|---|---|
| JP | 3651931 B2 | * | 5/2005 | |
| WO | WO-2017164345 A1 | * | 9/2017 | ............... B29B 7/48 |

OTHER PUBLICATIONS

Vector 4411A datasheet (Year: 2014).*

*Primary Examiner* — Mark S Kaucher
(74) *Attorney, Agent, or Firm* — MUNCY, GEISSLER, OLDS & LOWE, P.C.

(57) ABSTRACT

A styrene-isoprene-styrene triblock copolymer, a method for manufacturing the same, a composition, and an adhesive composition using the same are provided. The styrene-isoprene-styrene triblock copolymer includes a first polystyrene block, a polyisoprene block, and a second polystyrene block. Based on 100 wt % of the styrene-isoprene-styrene triblock copolymer, the content of the first polystyrene block and the second polystyrene block is 30-50 wt %, and the content of the polyisoprene block is 70-50 wt %. The weight average molecular weight (Mw) of the styrene-isoprene-styrene triblock copolymer is 40,000-75,000.

16 Claims, 7 Drawing Sheets

(51) Int. Cl.
  *C08K 5/00*        (2006.01)
  *C09J 7/35*        (2018.01)

(56)  References Cited

U.S. PATENT DOCUMENTS

| | | | | |
|---|---|---|---|---|
| 2008/0021160 | A1* | 1/2008 | Toney | C08L 53/02 |
| | | | | 525/98 |
| 2009/0137667 | A1* | 5/2009 | Kabanov | A01N 25/10 |
| | | | | 514/531 |
| 2011/0168329 | A1* | 7/2011 | Sajot | C09J 177/00 |
| | | | | 156/330.9 |
| 2011/0245430 | A1* | 10/2011 | Corzani | C09J 153/02 |
| | | | | 525/314 |
| 2012/0136114 | A1* | 5/2012 | Nishikawa | C08K 5/01 |
| | | | | 525/332.9 |
| 2016/0271291 | A1* | 9/2016 | Mansour | A61L 15/24 |
| 2016/0343970 | A1* | 11/2016 | Tazaki | B32B 27/08 |
| 2017/0282494 | A1* | 10/2017 | Alexis | C08J 9/0061 |
| 2019/0023949 | A1* | 1/2019 | Dalley | C09J 153/02 |
| 2019/0256686 | A1* | 8/2019 | Takayama | C08L 65/00 |
| 2022/0033599 | A1* | 2/2022 | Dotson | C08K 5/098 |

* cited by examiner

STYRENE-ISOPRENE-STYRENE TRIBLOCK COPOLYMER AND METHOD FOR MANUFACTURING THE SAME, COMPOSITION AND ADHESIVE COMPOSITION THEREOF

CROSS REFERENCE TO RELATED APPLICATIONS

This Application claims priority of China Patent Application No. 202010248735.1, filed on Apr. 1, 2020, the entirety of which is incorporated by reference herein.

BACKGROUND OF THE INVENTION

Technical Field

The disclosure relates to a styrene-isoprene-styrene triblock copolymer, a manufacturing method thereof, particles, and an adhesive composition thereof.

Description of the Related Art

Thermoplastic elastomer (TPE) is a polymer material that is currently being widely used in various applications due to its elastomer characteristics at room temperature and plasticity at high temperatures.

Styrenic block copolymers (SBCs) include styrene-butadiene-styrene block copolymer (SBS copolymer); styrene-ethylene-butylene-styrene copolymer (SEBS copolymer) which is a hydrogenated form of SBS copolymer; styrene-isoprene-styrene block copolymer (SIS copolymer); and styrene-ethylene-propylene-styrene copolymer (SEPS copolymer) which is a hydrogenated form of SIS copolymer.

SBS copolymer and SIS copolymer have both the characteristics of plastic and rubber. Of the two, SIS copolymer is a good adhesive and has an excellent sealing ability and high-temperature retention. It is widely used in the process of pasting medical materials and hygiene products, and the process of pasting electrical insulation, packaging, labels, and the like.

In order to increase the speed of production, an adhesive with high MFI (Melt Flow Index) is required to match the increased dispensing speed of the dispensing machine (a hot melt adhesive).

BRIEF SUMMARY

The disclosure provides a styrene-isoprene-styrene triblock copolymer, including a first polystyrene block, a polyisoprene block and a second polystyrene block, wherein based on 100 wt % of the styrene-isoprene-styrene triblock copolymer, the first polystyrene block and the second polystyrene block are in an amount of 30-50 wt %, the polyisoprene block is in an amount of 70-50 wt %, and the weight average molecular weight (Mw) of the styrene-isoprene-styrene triblock copolymer is 40,000-75,000.

The disclosure further provides a composition, which includes the styrenic block copolymer as mentioned above and antioxidant, and the composition provides a good MFI and a good toluene solution viscosity (TSV). The composition can be used to manufacture an adhesive composition with both ultra-high MFI and mechanical characteristics.

The disclosure further provides an adhesive composition, which includes 10-40 parts by weight of the composition as mentioned above and 30-70 parts by weight of tackifier.

The disclosure further provides a method for manufacturing styrene-isoprene-styrene triblock copolymer, the styrene-isoprene-styrene triblock copolymer comprising a first polystyrene block, a polyisoprene block and a second polystyrene block, the method comprising the following steps: performing a first polymerization reaction by adding styrene and initiator to form the first polystyrene block; performing a second polymerization reaction by adding isoprene to form the polyisoprene block at a terminal of the first polystyrene block; and performing a third polymerization reaction by adding styrene to form the second polystyrene block at an end of the polyisoprene block, wherein the total amount of added styrene is 30-50 parts by weight, the total amount of added isoprene is 70-50 parts by weight, and the weight average molecular weight (Mw) of the styrene-isoprene-styrene triblock copolymer is 40,000-75,000.

In order to make the objects, features and advantages of the invention mentioned above more apparent, some preferred embodiments and detailed explanations are given below with the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Even if a plurality of technical features are disclosed simultaneously by any of the embodiments described below, it is not intended that a person using this disclosure has to implement all the technical features of any embodiments simultaneously. That is, as long as the possibility of implementation is not affected, a person having ordinary skill in the art is able to optionally implement some of the technical features rather than all technical features according to the present disclosure depending on design concept or requirement, thereby increasing the flexibility of the implementation of the present disclosure.

In conventional methods of manufacturing styrene-isoprene-styrene triblock copolymer, styrene and isoprene are added to the reactor first for polymerization reaction to form styrene-isoprene S-I diblock copolymer, and then the coupling agent is added into the reactor to undergo a coupling reaction with the S-I diblock copolymer to form an S-I-I-S (i.e., S-I-S) triblock copolymer. However, in this manner, since portions of incompletely reacted S-I diblock copolymer remains in the reactor, the reaction product obtained contains not only the SIS triblock copolymer, but also residual S-I diblock copolymer, which is produced at unstable polymerization control. During the subsequent step of preparing particles, the properties of the particles, such as MFI and TSV, is affected by these residual S-I diblock copolymer. Therefore, a new method for manufacturing styrene-isoprene-styrene triblock copolymer is required such that the subsequently formed particles are free of S-I diblock copolymer.

To this end, the present disclosure provides a styrene-isoprene-styrene triblock copolymer (hereinafter also referred to as SIS copolymer) and a method for manufacturing the same. Particles are prepared from the manufactured copolymer in which the S-I diblock copolymer content is less than 1 wt %, such as less than 0.5% or 0.1%. In some embodiments, the particles formed are free of S-I diblock copolymer. Accordingly, the adhesive composition with ultra-high MFI and mechanical characteristics can be manufactured from particles having a good MFI and toluene solution viscosity to solve the problems mentioned above.

[1. Structure of Styrene-Isoprene-Styrene Triblock Copolymer (SIS Copolymer)]

As noted above, styrene can be polymerized with conjugated diene to form thermoplastic elastomer. For example, styrene can form SBS copolymer with butadiene or form SIS copolymer with isoprene. The properties of copolymer may be affected by different conjugated diene. For example, isoprene can provide the copolymer with more flexibility and greater viscosity compared to butadiene. In term of making adhesive, SIS copolymer is preferably used.

In conventional SIS copolymers, the mechanical properties are poor because isoprene provides copolymer with more flexibility. The SIS copolymer of the present disclosure can provide SIS copolymer with ultra-high MFI and mechanical characteristics due to the increased content of styrene in the polymer.

An embodiment of the present disclosure provides a styrene-isoprene-styrene triblock copolymer (SIS copolymer), including a first polystyrene block, a polyisoprene block and a second polystyrene block.

According to an embodiment of the present disclosure, the SIS copolymer has increased styrene content, for example, the total content of polystyrene block in SIS copolymer is above 30 wt %, such as above 30 wt %, 35 wt %, or 40 wt %. The mechanical characteristics of the SIS copolymer can be improved by controlling the total content of polystyrene block of the SIS copolymer to be more than 30 wt %.

According to an embodiment of the present disclosure, the styrene block content of the SIS copolymer is not exceeding 50 wt %, less than 50 wt %, not exceeding 45 wt %, or less than 45 wt %. The content of polyisoprene block of the SIS copolymer can be ensured by controlling the total content of polystyrene block to be not exceeding 50 wt %, thereby ensuring the flexibility of the triblock copolymer.

According to an embodiment of the present disclosure, the content of polyisoprene block of the SIS copolymer, for example, is not exceeding 80 wt %, not exceeding 70 wt %, not exceeding 65 wt % or not exceeding 60 wt %.

According to an embodiment of the present disclosure, the polyisoprene block content of the SIS copolymer is 40 wt % or more, 50 wt % or more, 55 wt % or more, or 60 wt % or more. The flexibility of the SIS copolymer can be improved by making the content of polyisoprene block of the SIS copolymer be 50 wt % or more.

In an embodiment, the content of polyisoprene block is 70 wt % when the total content of polystyrene block is 30 wt %.

In another embodiment, the content of polyisoprene block is 50 wt % when the total content of polystyrene block is 50 wt %

According to an embodiment of the present disclosure, the weight average molecular weight of the SIS copolymer may be between about 10,000 and 80,000, such as between about 40,000 and 80,000, between about 40,000 and 75,000, between about 40,000 and 60,000, between about 50,000 and 75,000.

The MFI of the SIS copolymer is associated with the composition and molecular weight thereof. The SIS copolymer is harder and has lower MFI when the polystyrene block content of the SIS copolymer increases and the polyisoprene block content of the SIS copolymer decreases. The MFI of the SIS copolymer is higher when the molecular weight is smaller. The polystyrene block content and the molecular weight of the copolymer make different contributions to MFI. Due to the higher polystyrene block content of the SIS copolymer according to the present disclosure, the molecular range of the triblock copolymer can be adjusted to achieve the desired MFI of the triblock copolymer.

For example, the polystyrene block content in the SIS copolymer is represented by A %, and the weight average molecular weight of the SIS copolymer is represented by B, the product of A and B (A×B) is preferably less than 3,200,000, more preferably less than 2,500,000 and even more preferably less than 2,000,000. For example, when the polystyrene block is 30%, the weight average molecular weight is preferably less than 106,666; when the polystyrene block is 40%, the weight average molecular weight is preferably less than 80,000; when the polystyrene block is 45%, the weight average molecular weight is preferably less than 71,111.

The SIS copolymer according to the present disclosure may comply with any one of the range of the polystyrene block content, the range of the weight average molecular weight, and the product of the polystyrene block content and the weight average molecular weight mentioned above, and preferably two or more of the above ranges are met at the same time.

[2. Method of Forming Styrene-Isoprene-Styrene Triblock Copolymer (SIS Copolymer)]

According to an embodiment of the present disclosure, styrene-isoprene-styrene triblock copolymer (SIS copolymer) is manufactured by polymerizing styrene and isoprene. Specifically, the polymerization reaction is anionic polymerization. It is easy to control the molecular weight of the synthesized polymer by using anionic polymerization, and the molecular weight of obtained polymer is relatively uniform. Anionic polymerization includes chain initiation, chain growth, and chain termination.

Styrene and initiator are added in the reactor to conduct the first polymerization reaction, and thereby the first polystyrene block is formed; isoprene is added to conduct the second polymerization reaction, and thereby the polyisoprene block is formed at a terminal of the first polystyrene block; and styrene is added to conduct the third polymerization reaction, and thereby the second polystyrene block is formed at a terminal of the polyisoprene block.

This synthesizing method of sequentially forming the first polystyrene block, polyisoprene block and the second polystyrene block does not produce residues of S-I diblock copolymer since the step of coupling styrene-isoprene (S-I) diblock copolymer is not performed.

The styrene used to form SIS copolymer may be a substituted or unsubstituted styrene. In some embodiment, the styrene used to form SIS copolymer is an unsubstituted styrene.

According to an embodiment of the present disclosure, the SIS copolymer has higher styrene content. For example, relative to 100 parts by weight of SIS copolymer, the amount of added styrene is 30 parts by weight or more, such as more than 30 parts by weight, 35 parts by weight or 40 parts by weight. The mechanical characteristics of the SIS copolymer can be improved by making sure that the styrene content of the SIS copolymer is more than 30 parts by weight.

According to an embodiment of the present disclosure, the styrene content of the SIS copolymer, relative to 100 parts by weight of SIS copolymer, for example, the amount of added styrene does not exceed 50 parts by weight, is less than 50 parts by weight, does not exceed 45 parts by weight, or is less than 45 parts by weight. The content of isoprene in the SIS copolymer can be ensured by making sure that the content of styrene does not exceed 50 parts by weight, thereby ensuring the flexibility of the SIS copolymer.

According to an embodiment of the present disclosure, relative to 100 parts by weight of SIS copolymer, the amount of isoprene added to the SIS copolymer, for example, does not exceed 80 parts by weight, does not exceed 70 parts by weight, does not exceed 65 parts by weight or does not exceed 60 parts by weight.

According to an embodiment of the present disclosure, relative to 100 parts by weight of SIS copolymer, the amount of isoprene added to the SIS copolymer, for example, is more than 40 parts by weight, more than 50 parts by weight, more than 55 parts by weight, or more than 60 parts by weight. The flexibility of the SIS copolymer can be improved by making sure that the total content of isoprene content of the SIS copolymer is more than 50 parts by weight.

In an embodiment, the amount of isoprene added is 70 parts by weight when the amount of styrene added is 30 parts by weight. In another embodiment, the amount of isoprene added is 50 parts by weight when the amount of styrene added is 50 parts by weight.

An anionic polymerization reaction is initiated by a reaction initiator, and the reaction initiator may be alkali metal, aromatic complex of alkali metal, or organic alkali metal compound. Examples of organic alkali metal compounds may be alkyllithium compounds including n-butyllithium, tertiary butyllithium, secondary butyllithium or m-butyllithium.

In the anionic polymerization reaction, the reaction initiator can activate the terminal of initiator monomer for chain growth. Relative to the same amount of initiator monomer, if there are more reaction initiators, a higher proportion of the terminal of the initiator monomer will be activated, and the molecular weight of the polymer obtained will be smaller. Therefore, the desired molecular weight of polymer may be obtained through adjusting the amount of reaction initiator depending on the desired molecular weight of polymer. For example, the amount of reaction initiator may be 0.01-20 parts by weight, such as 0.05-10 parts by weight or 0.1-10 parts by weight based on the total amount of styrene and isoprene added.

The following formula may also be used to estimate the amount of reaction initiator.

$$\text{amonut of the initiator added(mole)} = \frac{\text{total amount of the styrene and isoprene added(g)}}{\text{desired polymer } \textit{moleculatr} \text{ weight}\left(\frac{g}{\text{mole}}\right)}$$

In the formula above, "total amount of the styrene and the isoprene added (g)" refers to the sum of the total amount of styrene added (g) in the first step and the third step, and the total amount of isoprene added (g) in the second step. In addition, "desired polymer molecular weight (g/mole)" is the desired molecular weight of SIS copolymer.

As mentioned above, in some embodiments, the weight average molecular weight of the SIS copolymer of the present disclosure may be 40,000-75,000. Therefore, in some embodiments, the amount of initiator added is represent by the following formula:

$$\text{amonut of the initiator added(mole)} = \frac{\text{total amount of the styrene and the isoprene added(g)}}{40{,}000 - 75{,}000\left(\frac{g}{\text{mole}}\right)}$$

According to the formula above, in an embodiment, when the total amount of styrene added in the first step and the third step is 240 g and the total amount of isoprene added in the second step is 560 g (that is, the total amount of styrene and isoprene (g) is 800 g), the total amount of initiator added may be 0.01-0.02 mole.

Solvent may also be used in the polymerization reaction, and the solvent which do not react with the active anion terminal of polymer and has suitable solubility to styrene and isoprene may be selected. For example, aromatic solvent or aliphatic solvent may be used. To allow the polymerization reaction to proceed appropriately, an aliphatic solvent can be used, for example, cyclopentane, n-hexane, cyclohexane, cycloheptane, or the like. The solvents above can be used alone or in combination of two or more.

A reaction promoter, for example, tetrahydrofuran may be added to promote the polymerization reaction.

An initial temperature of the polymerization reaction (the first polymerization reaction, the second polymerization reaction and the third polymerization reaction) may be 30-60° C., such as 40-50° C. The polymerization reaction is an exothermic reaction, therefore, during the reaction process, the temperature increases gradually, and the reaction temperature can also be allowed to rise naturally. After the first polymerization reaction is completed, the second polymerization reaction can be directly performed. The temperature of the second polymerization reaction may be 30-60° C. After the second polymerization reaction is completed, the third polymerization reaction can be directly performed. The temperature of the third polymerization reaction may be 30-60° C.

The polymerization time of the first polymerization reaction, the second polymerization reaction and the third polymerization reaction can be appropriately adjusted according to the amount of reactants, for example, 1-60 minutes, 5-30 minutes or 10-25 minutes.

After completing the third polymerization reaction, the reaction terminator is added to perform chain termination. The terminator may be water or alcohol, for example, methanol or ethanol. The amount of reaction terminator can be adjusted appropriately as required.

After the termination of the polymerization reaction, the SIS copolymer is formed. The SIS copolymer may be further hydrogenated or added with functional group as required. Examples of functional groups may be carboxylic acid, acid anhydride, ester, amide, imine, or the like. The SIS copolymer of an embodiment of the present disclosure may be a hydrogenated SIS copolymer. The SIS copolymer of another embodiment of the present disclosure may be a non-hydrogenated SIS copolymer.

According to the SIS copolymer of the present disclosure, the vinyl group remains in the main chain when isoprene undergoes 1,4 addition (as shown in following formula (a)). The vinyl group is side-attached to the main chain, that is, the vinyl group is in the branch when isoprene undergoes 1,2 addition and 3,4 addition (1,2 addition as following formula (b), 3,4 addition as following formula (c)). The properties of the SIS copolymer are affected by the content of branched vinyl.

formula (a)

formula(b)

formula (c)

According to the SIS copolymer of the present disclosure, the content of branched vinyl (vinyl %) is in the range of 5-20 mole %, such as 8-15 mole % or 8-10 mole %.

The modifier may also be used to adjust and control the content of branched vinyl.

According to the SIS copolymer of an embodiment of the present disclosure, the content of the polystyrene block in the copolymer (SM %) can be in the range of 30-50 wt % by weight, for example, 35-50 wt % or 40-50 wt % as determined by nuclear magnetic resonance (NMR) analysis.

[3. Composition (Particles)]

The purification and extraction step may be used to separate SIS copolymer from the solution including SIS copolymer. The separated SIS copolymer is solid composition (particles). Examples of the purification and extraction steps include salting-out filtration, steam stripping, and the like.

In the SIS copolymer obtained by the reaction, the purification and separation steps may be performed after adding the anti-oxidant. Examples of the antioxidant include hindered phenols, amines, phosphites or the like. Commercially available products may also be used, for example, AO-1010, AO-1330, AO-1076 or AO-565. The amount of antioxidant can be adjusted appropriately as required, such as 0.05-4 phr or 0.1-2 phr, wherein phr refers to "parts by weight of antioxidant added in 100 parts by weight of copolymer".

The SIS copolymer obtained by the preparing method of the embodiments of present disclosure can be sued to make the composition (particles) with ultra-high fluidity, which can be represented by MFI. MFI refers to the weight of composition passing through the standard mold (2.095 mm) in every 10 minutes at a certain temperature and under certain load. The higher the MFI is, the higher the fluidity of the composition is. The temperature for measuring the MFI can be, for example, 190° C., 200° C., 230° C., 250° C. or the like. The load can be 2.16 kg, 5 kg or the like.

In some embodiments, the MFI (190° C./2.16 kg) of the composition according to the present disclosure is above 20 (g/10 min), for example, above 35 (g/10 min), above 50 (g/10 min) or above 100 (g/10 min).

In some embodiments, the MFI (190° C./5 kg) of the composition according to the present disclosure is above 80 (g/10 min), for example, above 90 (g/10 min) or above 100 (g/10 min).

In some embodiments, the TSV (25%) of the composition according to the present disclosure is less than 500 cps, for example, less than 250 cps or less than 100 cps.

[4. Adhesive Composition]

The adhesive composition may be manufactured using the composition according to the present disclosure. The adhesive composition includes the composition (particles). In some embodiments, the adhesive composition also includes tackifier, mineral oil/wax, antioxidant, or combinations thereof. The adhesive composition can be obtained by hot mixing the above components according to the required amounts. The mixing temperature may be 130-180° C. and the mixing time may be 1-48 hours. The commonly used mixing machine can be used for mixing, for example, vertical mixer, horizontal kneader, screw type, or the like.

The order of addition during manufacturing the adhesive composition can be adjusted as require. For example, if the amount of particles is high, the components can be added in the order of mineral oil/wax, antioxidant, tackifier, and particles. If the amount of particles is low, the components can be added in the order of mineral oil/wax, antioxidant, particles, and tackifier.

The content of the particles (the composition of the present disclosure) in the adhesive composition, based on 100 parts by weight of the adhesive composition, may be 10-40 parts by weight, for example, 15-40 parts by weight or 25-35 parts by weight. The content can be adjusted as required.

The adhesive composition includes a tackifier. A tackifier refers to a small molecule compound that can improve the viscosity of polymer materials, especially the surface viscosity, and is mainly used for polymer modification. Examples of commonly used tackifiers include natural rosin resin and the derivatives thereof; synthetic resins, such as C9 petroleum resin, C5 petroleum resin or hydrogenated petroleum resin. Commercially available products such as Exxon Escorez-5600 can also be used.

The content of the tackifier in the adhesive composition, relative to 100 parts by weight of the adhesive composition, may be 30-70 parts by weight, for example, 40-65 parts by weight. The content can be adjusted as required. The content of the tackifier is preferably greater than the content of the particles in the adhesive composition.

The adhesive composition includes mineral oil/wax, which can be those commonly used in the adhesive compositions. For example, Fischer Tropsch wax, naphthenic oil or paraffin oil.

The content of the mineral oil/wax in the adhesive composition can be 1-30 parts by weight relative to 100 parts by weight of the adhesive composition, for example, 5-20 parts by weight or 7-15 parts by weight. The content can be adjusted as required. It is noted that the content of mineral oil/wax in the adhesive composition can be reduced by using particles according to the present disclosure, thus achieving the effect of reducing oil (oil seepage) of the adhesive composition.

The adhesive composition may include an antioxidant, for example, the same one used for the particles mentioned above.

The content of the antioxidant in the adhesive composition, relative to 100 parts by weight of the adhesive composition, can be 0.01-10 parts by weight, for example, 0.1-5 parts by weight or 0.5-2 parts by weight. The content can be adjusted as required.

In the viewpoint of not causing degumming, the softening point is preferably higher than room temperature, for example, higher than 25° C. or higher than 35° C. The softening point of the adhesive composition according to the present disclosure is between 50-100° C., for example, between 60-90° C.

The viscosity at 120° C. of the adhesive composition according to the present disclosure is less than 25000 cps; the viscosity at 140° C. is less than 7500 cps; the viscosity at 160° C. is less than 3000; the viscosity at 180° C. is less than 1500 cps.

The adhesive composition according to the present disclosure provides good mechanical properties. The adhesive layer formed by the adhesive composition provides good peeling force and excellent retention, and also provides appropriate viscosity, tensile strength and elongation. Thus, the adhesive composition of the present disclosure is suitable for hot melt adhesives.

According to the adhesive composition of the present disclosure, the amount of mineral oil and solvent can be reduced due to the ultra-high MFI of the particles used. In addition to reducing the oil seepage of the adhesive composition, environmental pollution may also be reduced and the properties of the adhesive may be improved.

Due to the ultra-high MFI and mechanical properties as well as excellent adhesive properties of the adhesive composition according to the present disclosure, it can be widely used in labels, tapes, medical supplies, sanitary materials, hot melt adhesives and the like. For example, it can be used in the bonding of non-woven fabrics.

More specifically, it is suitable for use in adhesive machines for high-speed production. Adhesive machines for high-speed production require adhesives with good flow characteristics, such as dispensing and spraying. Since the adhesive composition of the present disclosure is prepared from the SIS copolymer with ultra-high MFI, the working temperature during the pasting process can be reduced, which provides good productivity and also reduce production costs.

Furthermore, since the adhesive composition of the present disclosure provides ultra-high MFI, it can be applied to spray coating to reduce the amount of adhesive and production costs.

The SIS copolymer of the disclosure will be described in more detail in the following embodiments. The following embodiments are used to further illustrate the disclosure, but they are not intended to limit the scope of the disclosure.

PREPARATION EXAMPLE 1

Styrene-Isoprene-Styrene Triblock Copolymer 22 g of styrene was added into 770 mL of cyclohexane, and then 0.1 mL of tetrahydrofuran (150 ppm) was added and thoroughly mixed in the reactor. Then, 0.61 g of n-butyllithium was added as an initiator, and then the reaction was performed at 40-50° C. for 20 minutes. Thereafter, 56 g of isoprene was added to perform a polymerization reaction. The temperature of the polymerization reaction rose naturally since the polymerization reaction was exothermic. After waiting for 10 minutes after reaching the maximum temperature of the polymerization reaction, 22 g of styrene was added for reaction, in which the temperature of the reaction rose naturally. Next, after waiting for 10 minutes after reaching the maximum temperature of the reaction, 0.1 mL methanol was added to terminate the reaction to obtain SIS copolymer 1.

0.5 phr antioxidant (e.g., AO-1010, 1330, 1076 or 565) was added to the reaction solution and was stirred well for dispersion. Thereafter, the solution was volatilized using steam stripping to obtain white solid Particle 1, containing SIS copolymer.

The weight average molecular weight (Mw) of the SIS copolymer in Particle 1 was 72,000 as measured by gel permeation chromatography (GPC) using gel permeation chromatograph (available from Waters CO., LTD).

NMR analysis was performed using superconducting nuclear magnetic resonance spectrometer (available from Varian Medical Systems CO., LTD). The content of polystyrene block (SM %) of the SIS copolymer in Particle 1 was measured to be 44.0% and the content of branched vinyl (vinyl %) was measured to be 8-10% through $^1$H-NMR spectrometry. The content of diblock copolymer was 0%. That is, Particle 1 was free of diblock copolymer.

PREPARATION EXAMPLES 2-8

Particles 2-8 were manufactured in the same manner as in Preparation Example 1, except that the contents of styrene in the first stage, tetrahydrofuran, n-butyllithium, isoprene, and styrene in the second stage were adjusted as shown in Table 1.

In addition, the Mw of the SIS copolymers was measured through GPC, while the polystyrene block content (SM %), branched vinyl content (vinyl %) and diblock copolymer content (diblock %) were measured through NMR analysis in the same manner as in Preparation Example 1. The results are shown in Table 1.

PREPARATION EXAMPLES 9-12

Particles 9-12 were manufactured in the same manner as in Preparation Example 1, except that the contents of styrene in the first stage, tetrahydrofuran, n-butyllithium, isoprene, and styrene in the second stage were adjusted as shown in Table 1, and the amount of cyclohexane added was changed to 6.2 L while the amount of methanol added was changed to 2 mL.

In addition, the Mw of copolymer was measured by GPC, and the SM %, vinyl % and diblock % were measured by NMR analysis in the same manner as in Preparation Example 1. The results are shown in Table 1.

TABLE 1

|  | Preparation Example 1 | Preparation Example 2 | Preparation Example 3 | Preparation Example 4 | Preparation Example 5 | Preparation Example 6 |
|---|---|---|---|---|---|---|
| Sample name | B6006 | NB-7050 | NA-7034 | NB-7049 | NA-7039 | NA-7038 |
| First stage styrene (g) | 22 | 22.5 | 22.5 | 22.5 | 20 | 18 |
| Isoprene (g) | 56 | 55 | 55 | 55 | 60 | 64 |
| Second stage styrene (g) | 22 | 22.5 | 22.5 | 22.5 | 20 | 18 |
| n-butyllithium (g) | 0.61 | 0.7 | 0.81 | 1.1 | 0.7 | 0.65 |
| Tetrahydrofuran (mL) | 0.102 | 0.100 | 0.106 | 0.098 | 0.097 | 0.105 |
|  | Particle 1 | Particle 2 | Particle 3 | Particle 4 | Particle 5 | Particle 6 |
| Antioxidant (Phr) | 0.5 | 0.5 | 0.5 | 0.5 | 0.5 | 0.5 |
| SM (%) | 44.0 | 45.0 | 45.0 | 45.0 | 40.0 | 36.0 |
| Mw | 72000 | 62000 | 54000 | 40000 | 63000 | 69000 |
| Vinyl (%) | 8~10 | 8~10 | 8~10 | 8~10 | 8~10 | 8~10 |
| Diblock (%) | 0 | 0 | 0 | 0 | 0 | 0 |
|  | Preparation Example 7 | Preparation Example 8 | Preparation Example 9 | Preparation Example 10 | Preparation Example 11 | Preparation Example 12 |
| Sample name | NB-7053 | ultra-high MFI SIS | lab-3 batch mixing | lab-3 batch mixing | lab-6 batch mixing | Pilot 5580 |
| First stage styrene (g) | 18 | 17.5 | 140 | 178 | 138.4 | 135.6 |
| Isoprene (g) | 64 | 65 | 520 | 444 | 523.2 | 528.8 |
| Second stage styrene (g) | 18 | 17.5 | 140 | 178 | 138.4 | 135.6 |
| n-butyllithium (g) | 0.8 | 0.88 | 5.5 | 5.8 | 5.8 | 5.4 |
| Tetrahydrofuran (mL) | 0.101 | 0.103 | 0.097 | 0.099 | 0.098 | 0.104 |
|  | Particle 7 | Particle 8 | Particle 9 | Particle 10 | Particle 11 | Particle 12 |
| Antioxidant (Phr) | 0.5 | 0.5 | 0.5 | 0.5 | 0.5 | 0.5 |
| SM (%) | 36.0 | 35.0 | 35.0 | 44.5 | 34.6 | 33.9 |
| Mw | 55000 | 50000 | 68000 | 64000 | 64000 | 69000 |
| Vinyl (%) | 8~10 | 8~10 | 8.34 | 8.5 | 8.42 | 9.9 |
| Diblock (%) | 0 | 0 | 0 | 0 | 0 | 0 |

COMPARATIVE EXAMPLES 1-3

The commercially available particle (GP-5516, LCY Chemical Corp.) was used in Comparative Example 1, which was measured to contain 25% diblock copolymer (diblock %) in addition to SIS copolymer. Specifically, the SM % of SIS copolymer in Comparative Example 1 was 16% and the Mw was 160,000. The commercially available SIS polymer (GP-5562 U, LCY Chemical Corp.) was used in Comparative Example 2. The SIS copolymer was measured to contain 45% polystyrene block (SM %), and the Mw of the SIS copolymer was 80,000. The commercially available SBS polymer (GP-3545, LCY Chemical Corp.) was used in Comparative Example 3, which was measured to contain 65% diblock copolymer (diblock %) in addition to SBS copolymer. Specifically, the SM % of SBS copolymer in Comparative Example 3 was 45% and the Mw was 80,000.

TABLE 2

|  | Comparative Example 1 | Comparative Example 2 | Comparative Example 3 |
|---|---|---|---|
| Product Number (polymer type) | GP-5516 (SIS) | GP-5562U (SIS) | GP-3545 (SBS) |
| SM (%) | 16.0 | 45.0 | 45.0 |
| Mw | 160000 | 80000 | 80000 |
| Vinyl (%) | 10~15 (commercial) | 10~15 (commercial) | 10~15 (commercial) |
| Diblcok (%) | 25 | 0 | 65 |

[Measurement of Diblock Copolymers]

Figure 1:
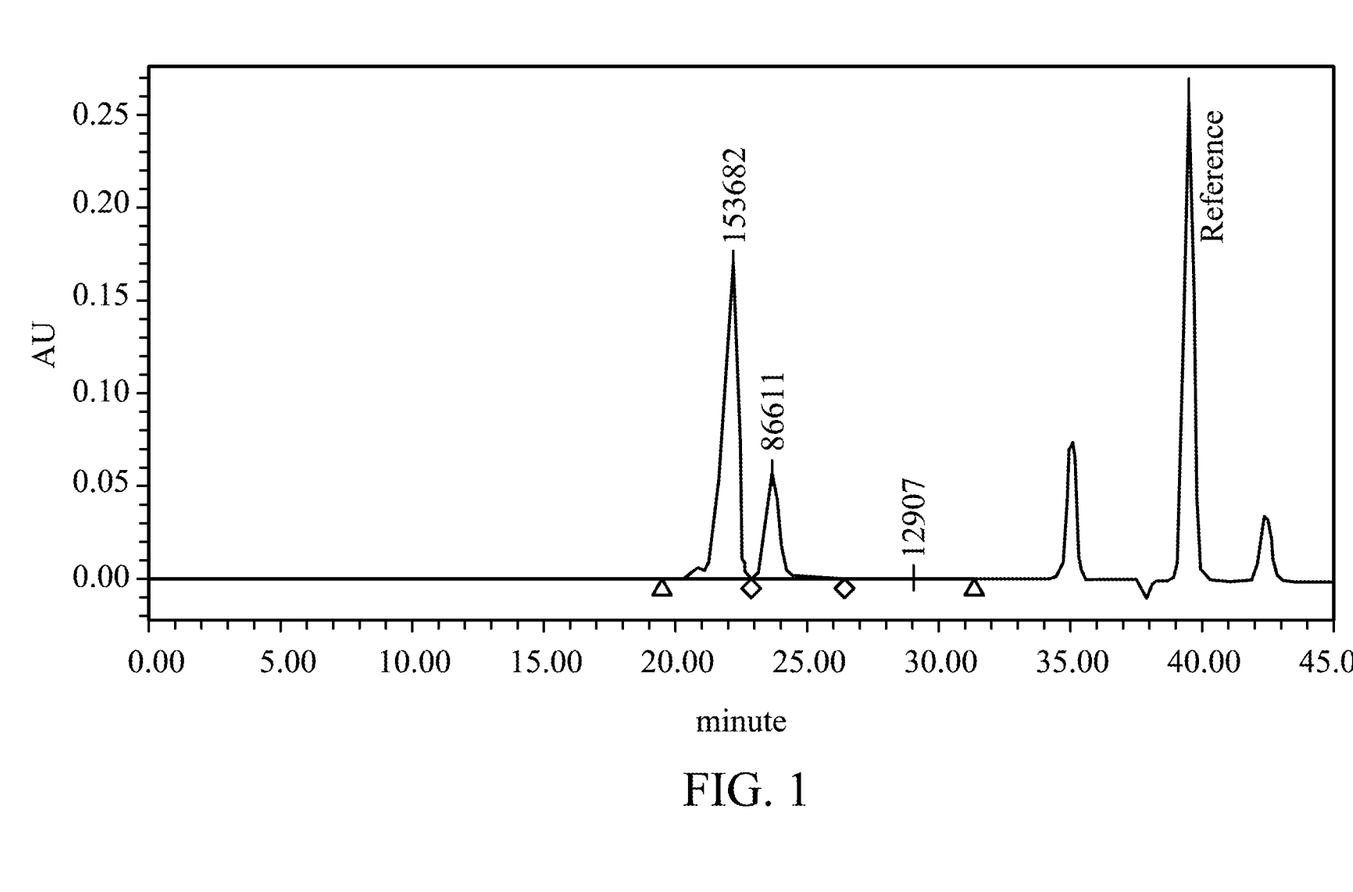
FIG. 1 is a gel permeation chromatography spectrum of a comparative example of the present disclosure.
Figure 2:
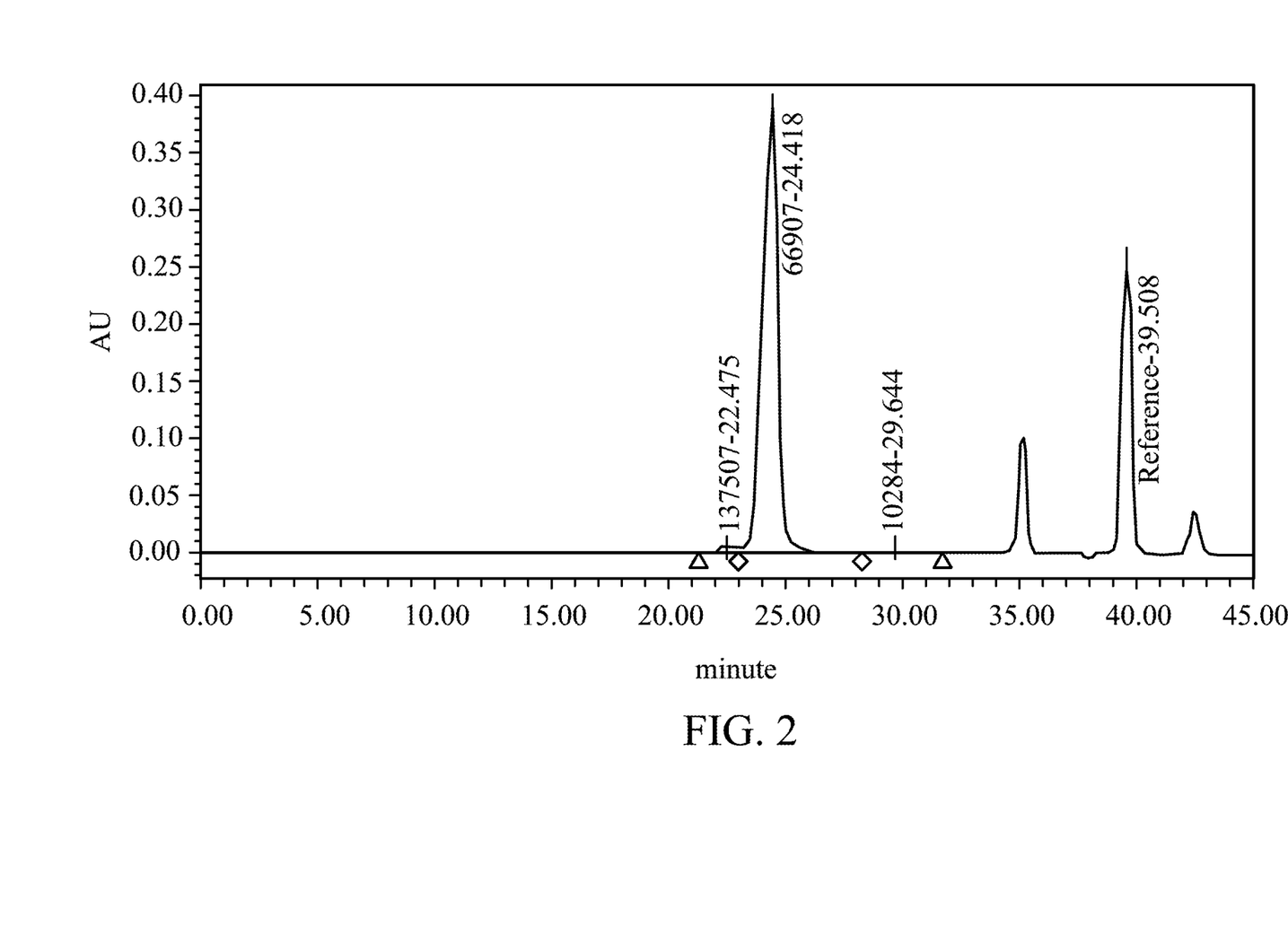
FIG. 2 is a gel permeation chromatography spectrum of an embodiment of the present disclosure.

The content of diblock copolymer in particles was measured by gel permeation chromatography (GPC). Since the molecular weight of diblock copolymer is less than that of triblock copolymer, the peak of diblock copolymer will presented after the peak of triblock copolymer. For example, FIG. 1 is GPC spectrum of SIS copolymer of Comparative Example 1. The main peak is followed by the peak of diblock copolymer having an area percentage which is 25%. FIG. 2 is GPC spectrum of SIS copolymer of Preparation Example 12. The main peak is not followed by the peak of diblock copolymer, which indicates that the SIS copolymer of Preparation Example 12 was free of diblock copolymer.

[Measurement of MFI (190° C./2.16 kg)]

The MFI (190° C./2.16 kg) of Particles 2-7, 12 and Comparative Examples 1-3 was measured at 190° C. under load 2.16 kg according to ASTM D1238 using melt flow indexer (GKO6, Dynisco CO., LTD). The results are shown in Table 3.

TABLE 3

| | Particle 12 | Particle 2 | Particle 3 | Particle 4 | Particle 5 | Particle 6 | Particle 7 | Comparative Example 1 | Comparative Example 2 | Comparative Example 3 |
|---|---|---|---|---|---|---|---|---|---|---|
| MFI (190° C./2.16 Kg) (g/10 min) | 22.8 | 35.3 | 144 | >200 | 35.7 | 30 | >200 | 5 | 9 | 30 |

The results in Table 3 show that the MFI (190° C./2.16 kg) of Particles 2-7 and 12 of the present disclosure, which are free of diblock copolymer, were above 20 (g/10 min), which is higher than the commercially available particles containing SIS copolymer in Comparative Examples 1 and 2. In addition, the MFI (190° C./2.16 kg) of Particles 4 and 7, in which the product of styrene content and the weight average molecular weight of the SIS copolymer (A×B) is less than 2,000,000, were above 200 (g/10 min), which provided excellent MFI.

[Measurement of MFI (190° C./5 kg)]

The MFI (190° C./5 kg) of Particles 8-11 and Comparative Examples 1-3 were measured at 190° C. under load 5 kg according to ASTM D1238 using melt flow indexer (GKO6, Dynisco CO., LTD). The results are shown in Table 4.

TABLE 4

| | Particle 8 | Particle 9 | Particle 10 | Particle 11 | Comparative Example 1 | Comparative Example 2 | Comparative Example 3 |
|---|---|---|---|---|---|---|---|
| MFI (190° C./5 kg) (g/10 min) | 84 | 152 | 160 | 103 | 9 | 28 | 50 |

The results in Table 4 show that the MFI (190° C./5 kg) of Particles 8-11 of the present disclosure, which were free of diblock copolymer, were above 80 (g/10 min). The MFI of Particles 8-11 were not only higher than that of the commercially available particles of Comparative Examples 1 and 2 containing SIS copolymer, but also higher than that of the commercially available particles of Comparative Example 3 containing SBS copolymer.

The results in Tables 3 and 4 show that the particles that are free of diblock copolymer of the present disclosure provided ultra-high-MFI due to the high melt flow index.

[Measurement of TSV (25%)]

The particles were fully dissolved in the toluene solution with a concentration of 25%, and then the viscosity was measured using a viscometer (Brookfield DV–II+) or a low-viscosity viscometer (Brookfield LVDV–II+). The results are shown in Table 5.

TABLE 5

| | Particle 8 | Comparative Example 2 | Comparative Example 3 |
|---|---|---|---|
| Sample name | ultra-high MFI SIS | GP-5562U | GP-3545 |
| TSV (25%) (cps) | 90 | 120 | 160 |

The results presented in Table 5 show that the particles of the present disclosure provided excellent toluene solution viscosity. Specifically, compared to the commercially available particles of Comparative Examples 2 and 3, Particle 8 of the present disclosure had lower TSV (25%). More specifically, the TSV (25%) of Particle 8 of the present disclosure was less than 100 cps.

[Physical Properties of Particles]

The tensile strength (kgf/cm²) and elongation (%) of Particle 12 and the commercially available particles of Comparative Examples 1-3 were measured using tension machine (3365, Instron CO., LTD). The results are shown in Table 6.

TABLE 6

| | Particle 12 | Comparative Example 1 | Comparative Example 2 | Comparative Example 3 |
|---|---|---|---|---|
| Sample name | Pilot 5580 | GP-5516 | GP-5562U | GP-3545 |
| tensile strength (kgf/cm²) | 106 | 159 | 182 | 90 |
| elongation (%) | 965 | >1000 | 860 | 600 |

The results in Table 6 illustrate that the tensile strength and elongation of the particles of the present disclosure were not inferior to the commercially available particles. Specifically, the tensile strength of Particle 12 of the present disclosure was even higher than that of the commercially available particles of Comparative Example 3. Additionally, the elongation of Particle 12 of the present disclosure was even higher than that of the commercially available particles of Comparative Example 2. It should be noted that the commercially available particles of Comparative Example 2 is also free of diblock copolymer. In other words, the content of polystyrene block and polyisoprene block of the SIS copolymer, and the molecular weight of the SIS copolymer in the particles of the present disclosure were adjusted so that the particles provided excellent MFI and toluene solution viscosity with good mechanical strength.

PREPARATION EXAMPLES 13-17

The styrene in the first stage was set to be 22 parts by weight, the isoprene was set to be 56 parts by weight, the styrene in the second stage was set to be 22 parts by weight, and the content of n-butyllithium was adjusted. Particles 13-17 of Preparation Examples 13-17 were manufactured in the same manner as in Preparation Example 1, wherein all the polystyrene block contents were maintained as about 45% and the weight average molecular weights were varied. The content of polystyrene block (SM %) and the content of branched vinyl (vinyl %) were measured using NMR analysis, and the results are shown in Table 7. The MFI (190° C./2.16 kg) of Particles 13-17 were measured at 190° C. under load 2.16 kg according to ASTM D1238 using melt flow indexer (GKO6, Dynisco CO., LTD). The results are shown in Table 7.

TABLE 7

|  | Preparation Example 13 | Preparation Example 14 | Preparation Example 15 | Preparation Example 16 | Preparation Example 17 |
| --- | --- | --- | --- | --- | --- |
| Sample number | KD9050 | NB-7049 | KD9051 | NA-7034 | NB-7050 |
| SM (%) | 46.3 | 45.0 | 45.5 | 45.0 | 45.0 |
| Mw | 41000 | 40000 | 45000 | 54000 | 62000 |
| Vinyl (%) | 9.4 | 8-10 | 9.2 | 8-9 | 8-9 |
| MFI (190/2.16 kg) (g/10 min) | 260 | 250 | 220 | 144 | 35 |

Figure 6:
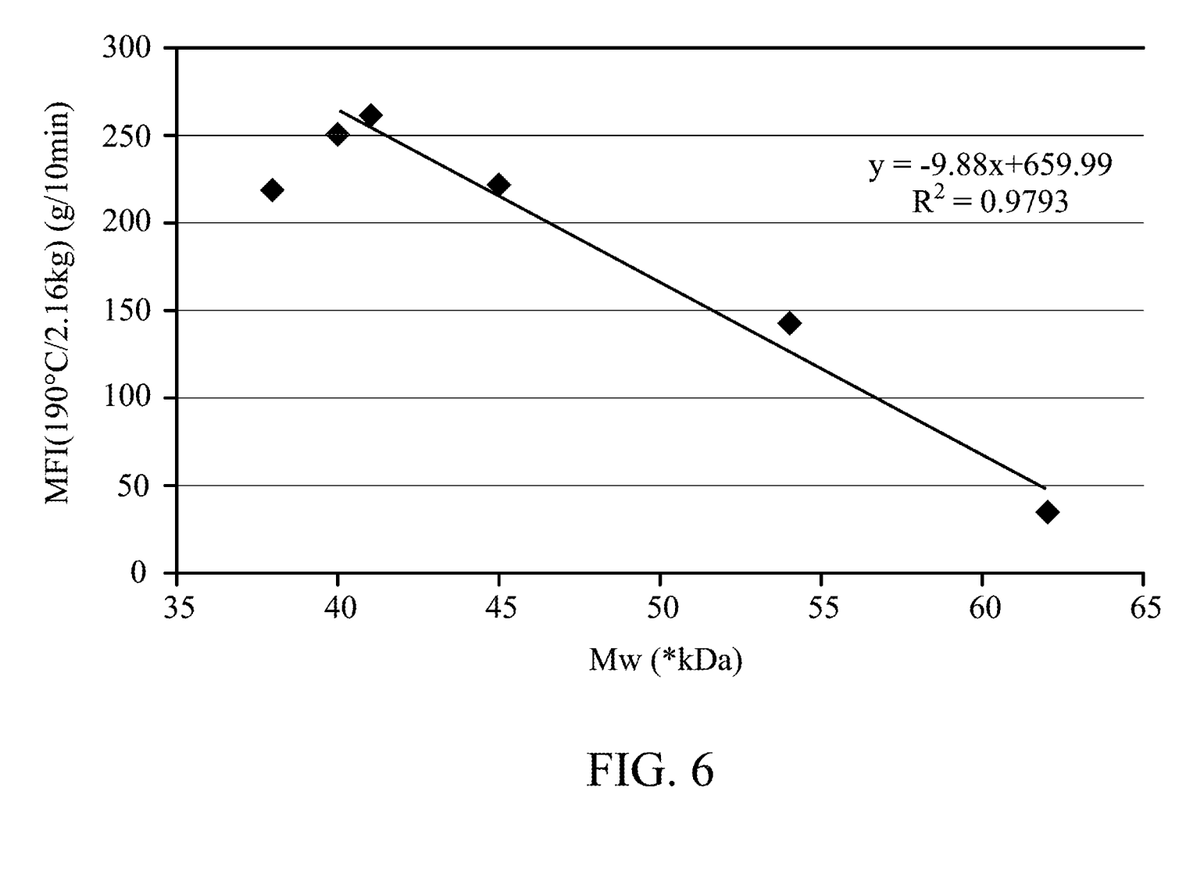
FIG. 6 is the relation diagram of weight average molecular weight and MFI of the examples of the present disclosure.

FIG. 6 is a graph with the weight average molecular weight (kDa) of Preparation Examples 13-17 as the horizontal axis, and the MFI (190° C./2.16 kg) of Preparation Examples 13-17 as the vertical axis. As can be seen in FIG. 6, the higher the weight average molecular weight, the lower the MFI of SIS copolymer. When the content of polystyrene block is 45%, the relationship of weight average molecular weight and MFI shows a linear relationship.

PREPARATION EXAMPLES 18-21

The styrene in the first stage was set to be 18 parts by weight, the isoprene was set to be 64 parts by weight, and styrene in the second stage was set to be 18 parts by weight, and the content of n-butyllithium was adjusted. Particles 18-21 of Preparation Examples 18-21 was manufactured in the same manner as in Preparation Example 1, which the polystyrene block contents were about 36% and the weight average molecular weights is different from each other. The content of polystyrene block (SM %) and the content of branched vinyl (vinyl %) were measured using NMR analysis. The results are shown in Table 8. The MFI (190° C./2.16 kg) of Particles 18-21 were measured at 190° C. under load 2.16 kg according to ASTM D1238 using melt flow indexer (GK06, Dynisco CO., LTD). The results are shown in Table 8.

TABLE 8

|  | Preparation Example 18 | Preparation Example 19 | Preparation Example 20 | Preparation Example 21 |
| --- | --- | --- | --- | --- |
| Sample number | NB-7053 | KD9052 | KD9053 | NA-7038 |
| SM (%) | 36.0 | 37.4 | 37.2 | 36.0 |
| Mw | 55000 | 62000 | 66000 | 69000 |
| Vinyl (%) | 8-10 | 9.5 | 10 | 8-10 |
| MFI(190° C./2.16 kg) (g/10 min) | 210 | 58 | 34 | 30 |

Figure 7:
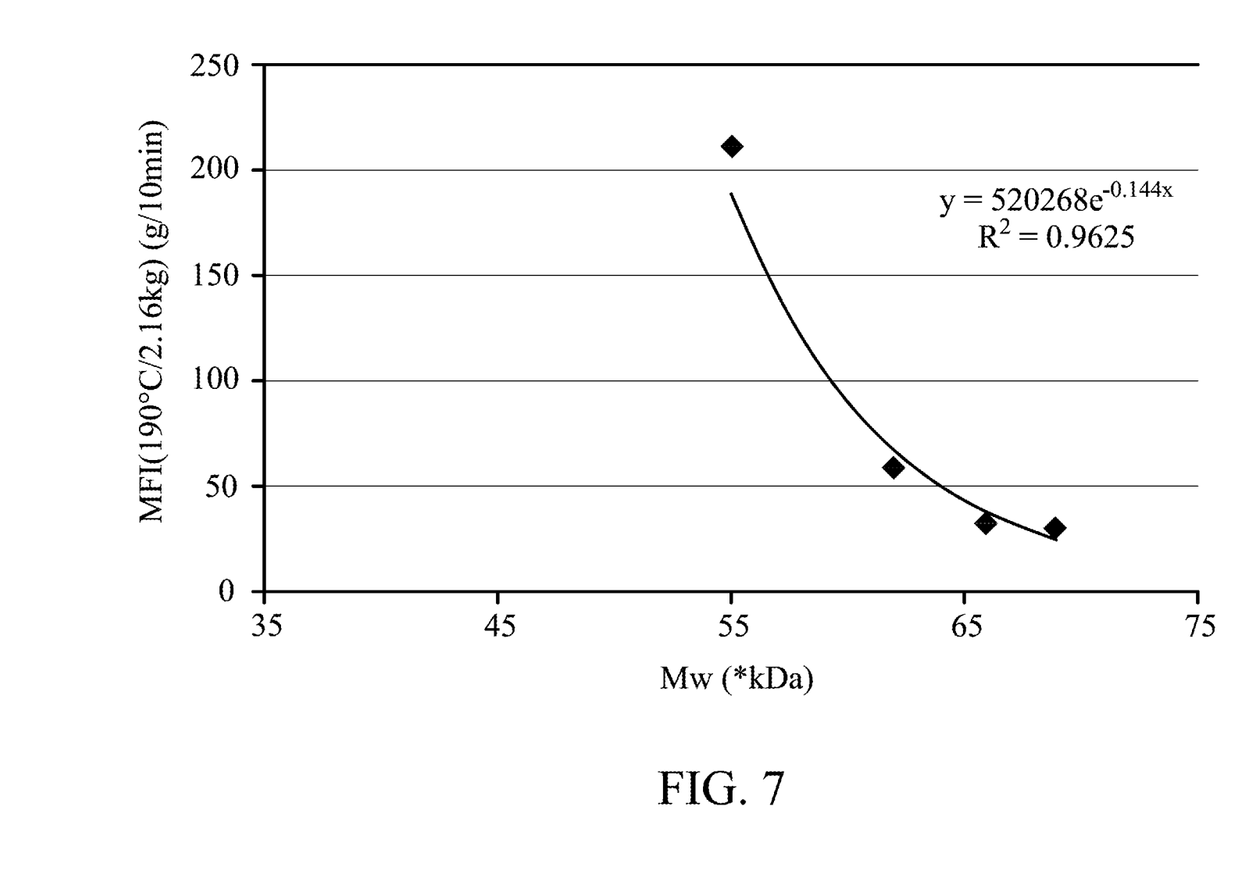
FIG. 7 is the relation diagram of weight average molecular weight and MFI of the other embodiments of the present disclosure.

FIG. 7 is a graph with the weight average molecular weight (kDa) of Preparation Examples 18-21 as the horizontal axis, and the MFI (190° C./2.16 kg) of Preparation Examples 18-21 as the vertical axis. As can be seen in FIG. 7, the higher the weight average molecular weight is, the lower the MFI of SIS copolymer is. When the content of polystyrene block is 35%, the MFI rise rapidly when the weight average molecular weight is less than 62,000.

[Adhesive Composition]

EXAMPLE 1

30 parts by weight of Particle 2, 59 parts by weight of E-5600 (C9 petroleum resin, Exxon Mobil) as tackifier, 10 parts by weigh of 150N (paraffin oil, Formosa) as mineral oil, and 1 part by weight of AO (1076+1010, BASF) were placed in the mixing tank (Minoga Industrial Co., Ltd, Laboratory vacuum stirring device HS-VP5) and mixed at 140° C. for 2 hours to obtain adhesive composition.

EXAMPLES 2-5

The adhesive composition was manufactured in the same manner as in Example 1, except the species of particles were changed as shown in Table 9.

The softening points of the adhesive composition in Examples 1-5 were measured and shown in Table 9 (ND represents not measured).

TABLE 9

|  |  | Example 1 Particle 2 | Example 2 Particle 6 | Example 3 Particle 5 | Example 4 Comparative Example 1 | Example 5 Comparative Example 2 |
| --- | --- | --- | --- | --- | --- | --- |
|  | type |  |  |  |  |  |
| Particle (part by weight) | part by weight | 30 | 30 | 30 | 30 | 30 |

TABLE 9-continued

|  | type | Example 1 Particle 2 | Example 2 Particle 6 | Example 3 Particle 5 | Example 4 Comparative Example 1 | Example 5 Comparative Example 2 |
|---|---|---|---|---|---|---|
| Tackifier (part by weigh) | E-5600 | 59 | 59 | 59 | 59 | 59 |
| Mineral oil (part by weigh) | K-150 | 10 | 10 | 10 | 10 | 10 |
| Antioxidant (part by weigh) | AO | 1 | 1 | 1 | 1 | 1 |
| Softening point (° C.) |  | 64.5 | 84.2 | 78.4 | 85.7 | 109.8 |
| Viscosity (cps) | 120° C. | ND | ND | ND | ND | ND |
|  | 140° C. | 770 | 1875 | 2025 | 15283 | 9830 |
|  | 160° C. | 445 | 995 | 9 40 | 9350 | 3215 |
|  | 180° C. | ND | ND | ND | ND | ND |

As can be seen from the Examples 1-3 shown in Table 9, the softening points of the adhesive composition of Examples 1-3 made by the particle of the present disclosure are between 50-100° C., so that the adhesive composition does not degum easily.

[Rheological Analysis]

3 g of adhesive composition of Examples 1-5 was taken as sample and was placed in rheometer (MCR300-modular compact rheometer, Anton Parr), the measurement was performed in the following condition: strain condition: 0.1% frequency: 0.1 Hz; temperature: −90-160° C. The results are shown in FIG. 3.

Figure 3:
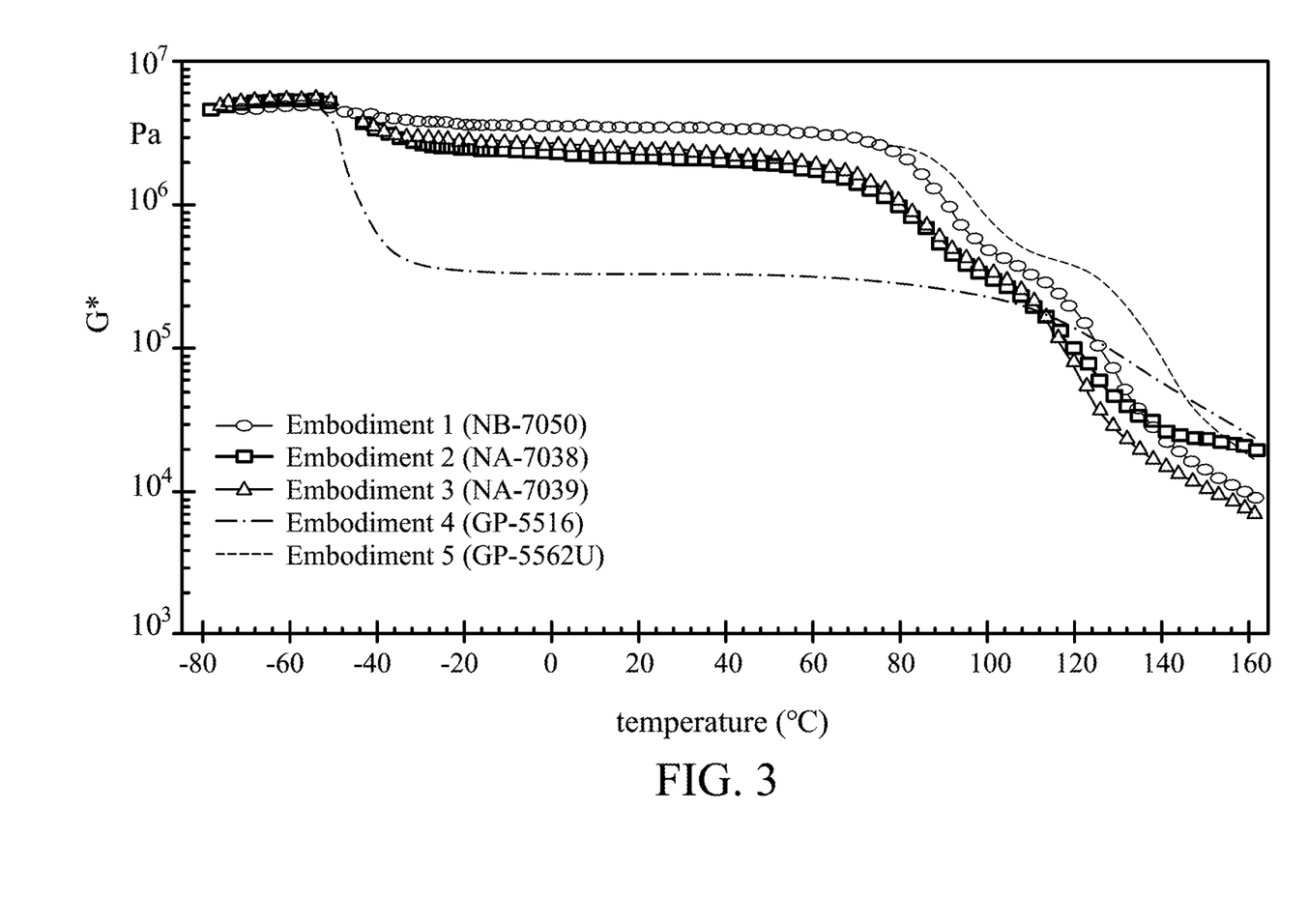
FIG. 3 is a rheological analysis chart of the examples of the present disclosure.

As can be seen from the FIG. 3, Examples 1-3 with high polystyrene block content and being free of diblock polymer provided high elastic modulus (G').

EXAMPLE 6

28 parts by weight of Particle 8, 58 parts by weight of E-5600 (C9 petroleum resin, Exxon Mobil) as tackifier, 13 parts by weigh of KN-4010 (Naphthenic oil, Karamay) as mineral oil, and 1 part by weight of AO (1:1 mixture of 1076 and 1010, BASF) were placed in the mixing tank (Minoga Industrial Co., Ltd, Laboratory vacuum stirring device HS-VP5) and mixed at 140° C. for 2 hours to obtain adhesive composition.

EXAMPLES 7-8

The adhesive composition was obtained in the same manner as in Example 6, except that the types of particles were changed as shown in Table 10.

[Characteristics of Adhesive Composition—Softening Point]

The softening points of the adhesive composition in Examples 6-8 were measured and shown in Table 10.

The viscosity of the adhesive composition in Examples 6-8 were measured using viscometer (Brookfield DV–II+). The results are shown in Table 10.

The tensile strength (kgf/cm$^2$) and elongation (%) of the adhesive composition in Examples 6-8 were measured using tension machine (3365, Instron CO., LTD). The results are shown in Table 10.

TABLE 10

|  |  | Example 6 | Example 7 | Example 8 |
|---|---|---|---|---|
| Particle (part by weight) | type | Particle 8 | Comparative Example 2 | Comparative Example 3 |
|  | part by weight | 28 | 28 | 28 |
| Tackifier (part by weight) | E-5600 | 58 | 58 | 58 |
| Mineral oil (part by weight) | KN-4010 | 13 | 13 | 13 |
| Antioxidant (part by weight) | AO | 1 | 1 | 1 |
| Softening point (° C.) |  | 89.2 | 98.2 | 83.9 |
| Viscosity (cps) | 120° C. | 23765 | 58867 | 29729 |
|  | 140° C. | 7217 | 12038 | 7775 |
|  | 160° C. | 2708 | 3930 | 3354 |
|  | 180° C. | 1347 | 1710 | 1558 |
| Tensile strength (kgf/cm$^2$) |  | 1.9 | 2.1 | 1.6 |
| Elongation (%) |  | 527 | 435 | 643 |

As the results in Table 10 show, the adhesive composition (Example 6) prepared from Particle 8 of the present disclosure has a viscosity (cps) at 120° C.-180° C. that is lower than the adhesive composition (Examples 7 and 8) prepared from the commercially available particle of Comparative Examples 2 and 3. In other words, the adhesive composition prepared from the particles of the present disclosure provided excellent MFI, which are suitable for a pasting process, especially as hot melt adhesive during high-speed pasting process.

Additionally, the results tabulated in Table 10 indicate that the mechanical strength (tensile strength and elongation) of the adhesive composition prepared from the particles of the present disclosure were not inferior to the adhesive composition prepared from the commercially available particles. Specifically, the tensile strength and elongation of the adhesive composition prepared from Particle 8 of the present disclosure was good, indicating good mechanical strength.

[Characteristics of Adhesive Composition—Rheological Analysis]

3 g of adhesive composition of Examples 6-8 was taken as sample and was placed in rheometer (MCR300-modular compact rheometer, Anton Parr) to perform the measurement. The results are shown in FIG. 4.

Figure 4:
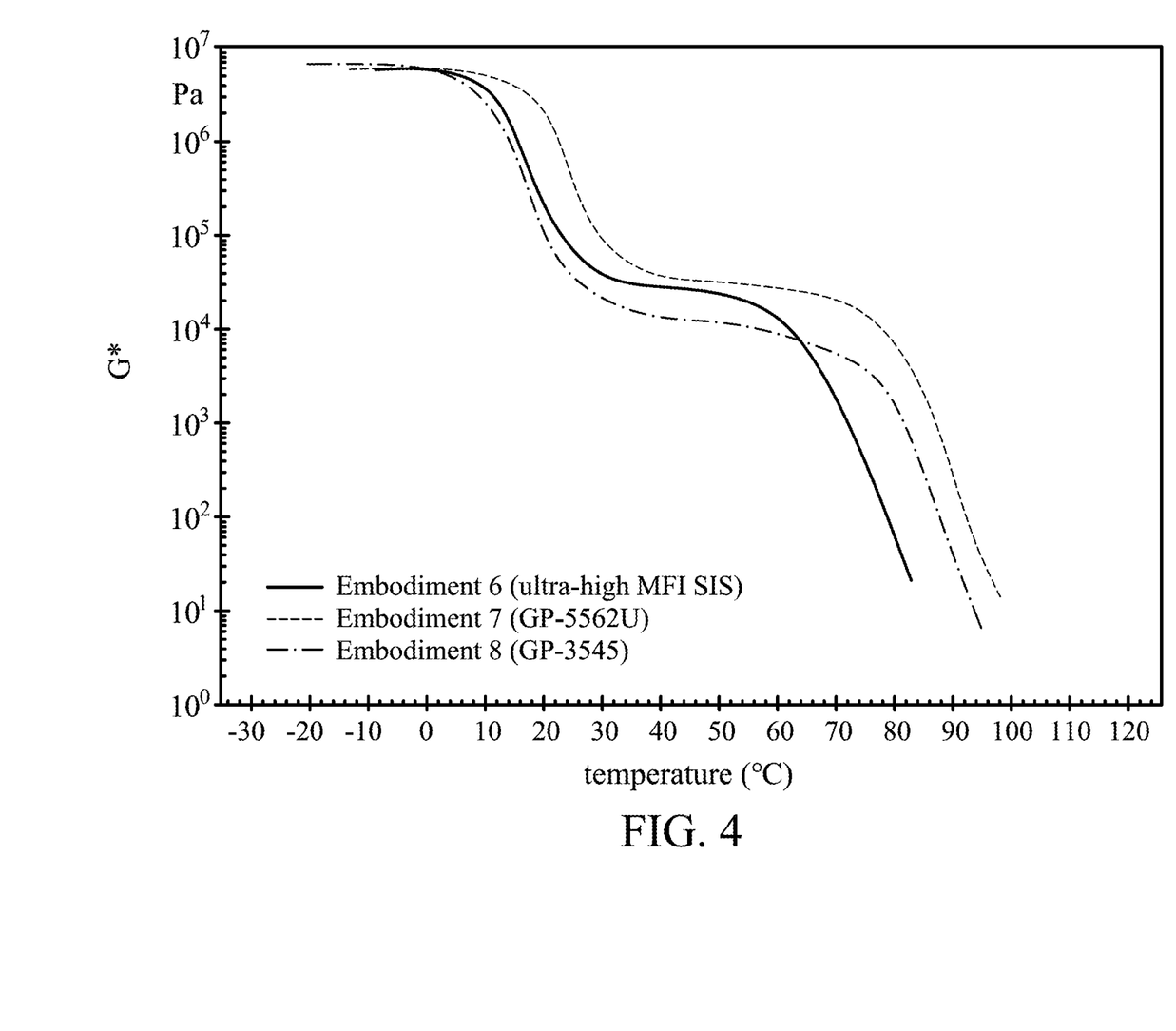
FIG. 4 is a rheological analysis chart of the examples of the present disclosure.

As can be seen from the FIG. 4, comparing with the adhesive composition (Examples 7 and 8) prepared from the commercially available particles of Comparative Examples 2 and 3 with a polystyrene block content of 45%, the adhesive composition (Example 6) prepared from Particle 8 of the present disclosure has a high elastic modulus (G') though having lower polystyrene block content (35%).

[Characteristics of Adhesive Composition—Peel Strength]

30 (g/m$^2$) of the adhesive composition of Examples 6-8 was coated as sample and the peel strength was tested. The results are shown in FIG. 5.

Figure 5:
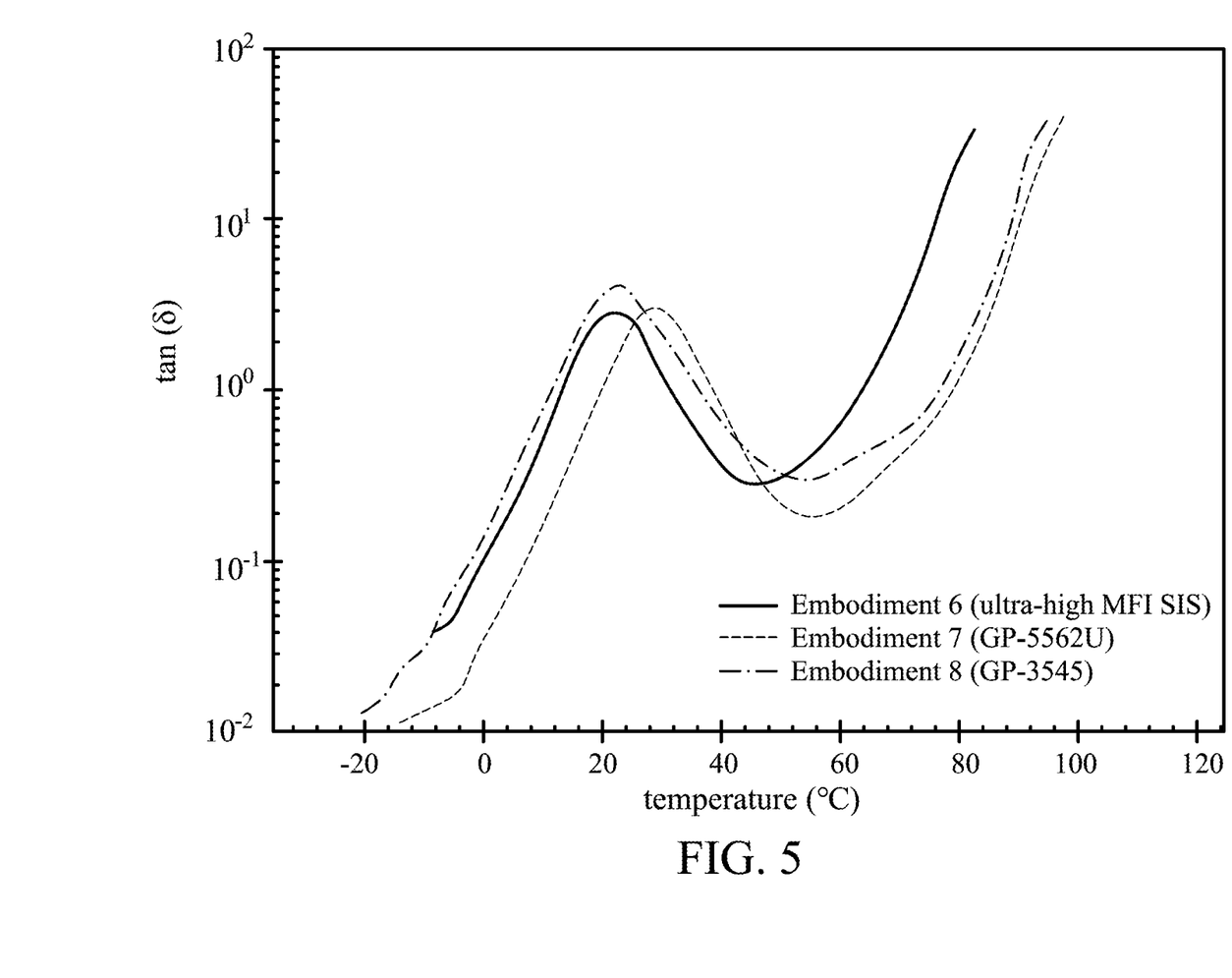
FIG. 5 is a rheological analysis chart (loss tangent) of the examples of the present disclosure.

As can be seen from the FIG. 5, in room temperature range (24° C.-44° C.), comparing with the adhesive composition (Examples 7 and 8) prepared from the commercially available particles of Comparative Examples 2 and 3 with a polystyrene block content of 45%, the adhesive composition (Example 6) prepared from Particle 8 of the present disclosure provided a better peel strength.

[Peel Characteristics Test]

EXAMPLES 9

The adhesive composition of Example 6 (the adhesive composition prepared from Particle 8 of the present disclosure) was coated on the substrate film (PET film, NAN YA PLASTICS CORP.) and Tape 1 with an adhesive layer was obtained, which has a thickness of 50 (g/m$^2$) after drying.

EXAMPLES 10-11

Tapes 2 and 3 were manufactured in the same manner as in Example 9, except the species of particles were changed as shown in Table 11.

The adhesive layer of Tapes 1-3 was pasted at stainless steel test specimen, and the tape was peeled at a basis weight of 30 gsm, 50 gsm, peel angle 90° and 180°, and peel speed 30 (cm/min). Then, the remaining trace of adhesive layer on stainless steel test specimen was observed. The evaluation was performed according to the following criteria and the results are shown in Table 11.

TF (Transfer): the adhesive layer was completely transferred to stainless steel test specimen and the surface of the substrate of tape was free of residual adhesive, which was evaluated as "⊚".

AF (Adhesive failure): the adhesive layer was torn and peeled off with the tape, and the surface of stainless steel test specimen was free of residual adhesive, which was evaluated as "⊙".

SS (Strick-up): portions of the adhesive layer was peeled off with the tape, and striped residue of the adhesive layer remains on the surface of stainless steel test specimen, which was evaluated as "Δ".

CF (Cohesive failure): the adhesive layer was broken. The portions of the adhesive layer near the side of tape was peeled off with the tape, while the portions of the adhesive layer near the side of stainless steel test specimen was remained at the surface of stainless steel test specimen, which was evaluated as "✕".

TABLE 11

|  |  |  | Example 9 | Example 10 | Example 11 |
|---|---|---|---|---|---|
| Particle type |  |  | Particle 8 | Comparative Example 2 | Comparative Example 3 |
| Tape number |  |  | Tape 1 | Tape 2 | Tape 3 |
| Peel strength (N/in) | 30 gsm | 90° | ⊚ | ⊚ | ⊚ |
|  |  | 180° | ⊚ | ✕ | ✕ |
|  | 50 gsm | 90° | ⊚ | ⊚ | Δ |
|  |  | 180° | ⊚ | ⊚ | ✕ |

The results in Table 11 show that Tape 1, which was prepared from the particles of the present disclosure, provides good peel strength at a basis weight of 30 gsm, 50 gsm and peel angle 90° and 180°. On the contrary, Tape 2, which was prepared from the particles of Comparative Example 2, provides poor peel strength at a basis weight of 30 gsm, peel angle 180°. Tape 3 was prepared from the particles of Comparative Example 3, and it provides poor peel strength at a basis weight of 30 gsm, peel angle 180° and at a basis weight of 50 gsm, peel angle 180.

EXAMPLES 12-14

[Shear Adhesive Failure Temperature]

The adhesive layers of Tapes 1-3 were pasted at stainless steel test specimen. After hanging a 1 kg weight, the temperature was raised at 1° C./min, and the shear adhesive failure temperature (SAFT) of the tape was measured. The higher the temperature indicates the higher ability of the tape to withstand high temperature. The results are shown in Table 12.

[Holding Force]

The adhesive layers of Tapes 1-3 were pasted on stainless steel test specimen. After hanging a 1 kg weight, the entire set were placed immediately in an oven at a constant temperature of 50° C. The time (hr) from hanging the weight to the weight falling was measured as the holding force of the tape. The results are shown in Table 12.

TABLE 12

|  |  | Example 12 | Example 13 | Example 14 |
|---|---|---|---|---|
| Particle species |  | Particle 8 | Comparative Example 2 | Comparative Example 3 |
| Tape number |  | Tape 1 | Tape 2 | Tape 3 |
| SAFT (° C.) | 30 gsm | 82.3 | 88.1 | 81 |
|  | 50 gsm | 81.1 | 84.9 | 78.3 |
| Holding force (hr) | 30 gsm | 7.7 | 12 | 8.7 |

The results presented in Table 12 show that Tape 1, which was prepared from the particles of the present disclosure, provides better SAFT than Tape 3 (SBS copolymer). At the same time, Tape 1 also provides sufficient holding force.

The results shown in Tables 11 and 12 indicate that an adhesive layer prepared from the particle of the present disclosure provides excellent peel characteristics and holding force.

[Ageing Resistance]

The adhesive composition of Examples 6-8 was placed in an oven at 180° C. for 72 hours. Thereafter, the change in the appearance of the adhesive was observed, to confirm whether or not a skin formed on the surface of adhesive and an edge ring was generated on the contact surface of the adhesive with the sample bottle. The viscosity (cps) at 160° C. was measured. The results are shown in Table 13.

TABLE 13

|  | Example 6 | Example 7 | Example 8 |
|---|---|---|---|
| Particles species | Particle 8 | Comparative Example 2 | Comparative Example 3 |
| Sample name | Ultra-high MFI SIS | GP-5562U | GP-3545 |
| Viscosity 160° C. (cps) | 795 | 1107 | 2583 |
| Edge ring | Yes | Yes | Yes |
| Skinning | No | No | Yes |

The results in Table 13 show that the heat-resistant characteristics of the adhesive composition of Example 6 prepared from the particles of the present disclosure were not inferior to, or were better than, those of the adhesive composition (Examples 7 and 8) prepared from the commercially available particles. Specifically, even under a high temperature for a period of time, the adhesive composition of Example 6 does not age easily. Therefore, the adhesive composition prepared from the particles of the present disclosure is suitable for use in an adhesive machine.

The SIS copolymer of the present disclosure provides an excellent MFI and toluene solution viscosity, and the adhesive composition with ultra-high MFI and mechanical characteristics can be prepared from the SIS copolymer of the present disclosure. The adhesive composition is suitable for application in a pasting process, especially as a hot melt adhesive in high-speed pasting process.

What is claimed is:

1. A composition, comprising a styrene-isoprene-styrene triblock copolymer, wherein the triblock copolymer comprises a first polystyrene block, a polyisoprene block and a second polystyrene block, wherein
   based on 100 wt % of the styrene-isoprene-styrene triblock copolymer, the first polystyrene block and the second polystyrene block are in an amount of 35-50 wt %, and the polyisoprene block is in an amount of 65-50 wt %,
   a weight average molecular weight (Mw) of the styrene-isoprene-styrene triblock copolymer is 50,000-75,000, and
   the styrene-isoprene-styrene triblock copolymer comprises 8-20 mol % of branched vinyl groups, wherein a melt flow index (MFI)(190° C./2.16 kg) of the composition is above 35 (g/10 min) and a toluene solution viscosity (TSV)(25%) of the composition is less than 100 cps.

2. A composition, comprising a styrene-isoprene-styrene triblock copolymer, wherein the triblock copolymer comprises a first polystyrene block, a polyisoprene block and a second polystyrene block, wherein
   based on 100 wt % of the styrene-isoprene-styrene triblock copolymer, the first polystyrene block and the second polystyrene block are in an amount of 35-50 wt %, and the polyisoprene block is in an amount of 65-50 wt %,
   a weight average molecular weight (Mw) of the styrene-isoprene-styrene triblock copolymer is 50,000-75,000, and
   the styrene-isoprene-styrene triblock copolymer comprises 8-20 mol % of branched vinyl groups, wherein a melt flow index (MFI)(190° C./2.16 kg) of the composition is above 35 (g/10 min), a styrene isoprene diblock copolymer in the composition is less than 1 wt % and a toluene solution viscosity (TSV) (25%) of the composition is less than 100 cps.

3. The composition as claimed in claim 2, further comprising an antioxidant.

4. The composition as claimed in claim 2, wherein the composition is free of the styrene-isoprene diblock copolymer.

5. The composition as claimed in claim 3, wherein the antioxidant is present in an amount of 0.05-4 parts by weight, based on 100 parts by weight of the styrene-isoprene-styrene triblock copolymer.

6. The composition as claimed in claim 2, wherein a melt flow index (MFI)(190° C./5 kg) of the composition is above 80 (g/10 min).

7. The composition as claimed in claim 2, wherein the composition is in a form of a particle or rubber strip.

8. An adhesive composition, comprising
   10-40 parts by weight of the composition as claimed in claim 2; and
   30-70 parts by weight of tackifier.

9. The adhesive composition as claimed in claim 8, further comprising 5-20 parts by weight of mineral oil and/or wax.

10. The adhesive composition as claimed in claim 8, further comprising 0.1-5 parts by weight of an antioxidant.

11. The adhesive composition as claimed in claim 8, wherein a viscosity of the adhesive composition is less than 25000 cps at 120° C.

12. The adhesive composition as claimed in claim 8, wherein a softening point of the adhesive composition is between 50-100° C.

13. The adhesive composition as claimed in claim 8, wherein the adhesive composition is hot melt adhesive.

14. A method for manufacturing styrene-isoprene-styrene triblock copolymer, the styrene-isoprene-styrene triblock copolymer comprising a first polystyrene block, a polyisoprene block and a second polystyrene block, the method comprising the following steps:
   performing a first polymerization reaction by adding styrene and initiator to form the first polystyrene block;
   performing a second polymerization reaction by adding isoprene to form the polyisoprene block at a terminal of the first polystyrene block; and
   performing a third polymerization reaction by adding styrene to form the second polystyrene block at an end of the polyisoprene block,
   wherein a total amount of the styrene added is 35-50 parts by weight, a total amount of the isoprene added is 65-50 parts by weight,
   wherein a weight average molecular weight (Mw) of the styrene-isoprene-styrene triblock copolymer is 50,000-75,000, and
   wherein the styrene-isoprene-styrene triblock copolymer comprises 8-20 mol % of branched vinyl groups, wherein a melt flow index (MFI)(190° C./2.16 kg) of the composition is above 35 (g/10 min), a styrene isoprene diblock copolymer in the composition is less than 1 wt % and a toluene solution viscosity (TSV) (25%) of the composition is less than 100 cps.

15. The method as claimed in claim 14, wherein the first polymerization reaction, the second polymerization reaction and the third polymerization reaction are anionic polymerization reactions.

16. The method as claimed in claim 14, wherein an amount of the initiator added is represented by following formula:

amount of the initiator added (mole)=

$$\text{amonut of the initiator added(mole)} = \frac{\text{total amount of the styrene and the isoprene added(g)}}{40{,}000 - 75{,}000\left(\frac{\text{g}}{\text{mole}}\right)}.$$

\* \* \* \* \*